Aug. 9, 1966     T. J. VAN DER WEEL     3,265,592
KETONE RECOVERY BY STEAM AND ALKALI CONTACT
Filed April 22, 1964
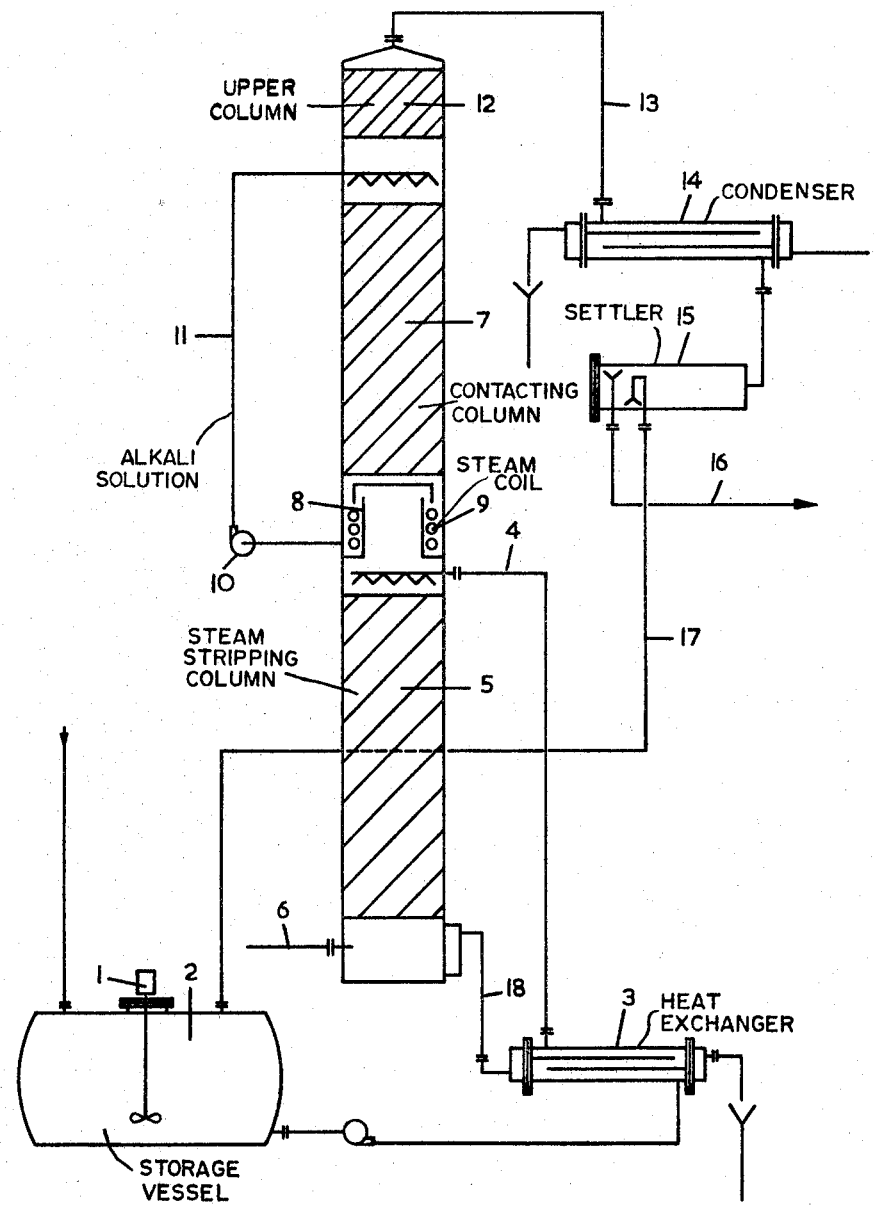
T. J. VAN DER WEEL     INVENTOR.
BY
WENDEROTH, LIND & PONACK
Atty's United States Patent Office 3,265,592
Patented August 9, 1966

3,265,592
KETONE RECOVERY BY STEAM AND
ALKALI CONTACT
Thonis Johannes van der Weel, Zandvoort, Netherlands, assignor to N.V. Algemeene Norit Maatschappij, Amsterdam, Netherlands, a corporation of the Netherlands
Filed Apr. 22, 1964, Ser. No. 363,668
Claims priority, application Netherlands, May 9, 1961, 264,566
3 Claims. (Cl. 203—37)

This application is a continuation-in-part of application Ser. No. 133,599, Aug. 24, 1961.

The present invention relates to a process for the recovery of ketones and of mixtures of ketones with other relatively water immiscible solvents, such as hydrocarbons.

In industrial practice it frequently happens, that vapors of solvents are recovered from gases containing them, by passing the gases through a particulate layer of activated carbon and adsorbing the vapors on the activated carbon.

When the activated carbon becomes saturated with the vapors, the carbon is reactivated, for example by subjecting it to the action of steam and the escaping mixture of steam and solvent vapors is condensed. From this condensate, in most cases, the solvents can be recovered by distillation with relative ease.

When it is attempted to recover ketones in this way, especially ketones containing 4-6 carbon atoms, it is found that the ketone obtained by the action of steam is contaminated by slight amounts of oxidation products, which have been formed during the adsorption and desorption cycle through a reaction of the ketone with air or other oxidizing gases under the catalytic influence of the activated carbon. More particularly those ketones, which contain an active methylene group adjacent to the keto group may readily be oxidized at the methylene group, so that, for example, peroxides, yellow diketo-compounds such as diacetyl, acids etc. will form. (A. K. Doolittle, The Technology of Solvents and Plasticizers, p. 331, J. Wiley & Sons, N.Y., 1954 and Chemie-Ingenieur-Technik, 28, p. 575 (1956). Many of these oxidation products have a boiling point which is closely adjacent to that of the parent ketone and for this reason it is difficult to separate them by distillation. Unless the impurities are removed, however, the value of the recovered ketones is considerably reduced.

The same problems occur, when it is desired to recover a mixture of vapors of ketones and other solvents, especially solvents which have a boiling point nearly the same as that of the ketone, such as a mixture of hexane, petroleum fractions, having a boiling range between 60 and 140° C., benzene or toluene with methyl ethyl ketone, diethyl ketone methyl-n-butyl ketone, ethyl-n-propyl ketone, methyl isobutyl ketone or methyl-n-propyl ketone. These solvents are difficult to separate from the ketones by separation and unless the contaminating substances are removed, the value of the entire mixture is considerably reduced.

In U.S. Patent 2,429,484 it has been proposed to decompose the diketones so recovered by heating the recovered ketones with a sodium hydroxide solution for a period ranging between 15 minutes and 1 hour. By these means the diketones, such as diacetyl, are resinified and become non-volatile, and this makes it possible to recover the ketone in a relatively pure form. This method is however time consuming and cumbersome.

The condensed mixture obtained by the action of steam on the activated carbon often separates in two layers. The water layer mostly contains enough ketone to make recovery attractive. The water layer also contains the greater part of the oxidation products.

In actual practice so far first the layer of water was separated and neutralized with a caustic soda solution in order to bind the acid and subsequently an azeotropic mixture of ketone and water was removed by distillation in a fractionating column. During this distillation the diketo compounds present, which may amount to 0.1–1.0% of the ketone, were distilled at the same time and imparted a yellow color to the distillate. This impure ketone from the water layer was then added to the ketone layer and treated with a caustic soda solution in order to resinify the impurities to form non-volatile compounds. After the resinification the impure ketone was purified by fractionation.

This treatment is cumbersome and uneconomical, because a large portion of the ketone must be distilled twice and each of the treatments must be carried out separately. It is not efficient either to resinify the resinforming constituents prior to the first distillation because in that case large amounts of caustic soda solution will be necessary in order to reach the concentration required for the resinification.

The invention provides a process for recovering ketones, which may contain not over 2 parts of a solvent, which is miscible with the ketone, and which together with the ketone can be volatilized from a ternary mixture with water for each part of ketone, from a mixture of the ketone, the solvent, non volatile impurities and volatile impurities, said volatile impurities beng capable of forming resins in alkali solution, comprising:

(1) steam-stripping said mixture in a distillation zone, whereby a vaporous admixture of ketone, solvent, water and volatile impurities is produced as distillate, and aqueous admixture of non-volatile impurities is produced as bottoms, (2) contacting said distillate with counter-flowing alkali solution in a vapor-liquid contact zone, whereby said volatile impurities are resinified and accumulate in said alkali solution, and said vaporous admixture of ketone, solvent and water form a second distillate, and (3) condensing said second distillate, whereby contiguous layers of liquid water and ketone and solvent are formed.

In another embodiment the invention provides a process for recovering ketone which may contain not over two parts of a solvent, which is miscible with the ketone and relatively immiscible with water and which together with the ketone can be volatilized from a ternary mixture with water from a mixture of ketone, solvent, water, volatile impurities and non-volatile impurities, said volatile impurities being capable of forming resins in alkali solution comprising:

(1) steam-stripping said mixture in a distillation zone, at a temperature of about 100° C., whereby a vaporous admixture of ketone, solvent, water and volatile impurities is produced as distillate, and aqueous admixture of non-volatile impurities is produced as bottoms, (2) contacting said distillate with counter-flowing alkali solution in a vapor-liquid contact zone, whereby said volatile impurities are resinified and accumulate in said alkali solution, and said vaporous admixture of ketone, solvent and water form a second distillate, (3) distilling said second distillate from step (2) in a second distillation zone to remove therefrom entrained liquid alkali, and (4) condensing the resultant alkalifree distillate whereby a liquid water layer and a contiguous layer containing the ketone and the solvent are formed, and (5) recovering the layer containing the ketone and the solvent.

The solvents, admixed with the ketones, may be any solvents which are miscible with the ketone or ketones and which may be volatilized together with the ketones from a ternary mixture with water. This implies, that the boiling points of the ketone and the solvent should not have a great difference. Such solvents may, for example, be hydrocarbons, ethers and higher alcohols. Mixtures with esters preferably are not recovered in this way, because the esters would at least partially be hydrolyzed by the action of the alkali hydroxide solution.

This process can be applied to recover a series of ketones, for example methyl ethyl ketone, methyl-n-propyl ketone, methyl-n-butyl ketone, methyl isobutyl ketone, diethyl ketone and ethyl-n-propyl ketone or mixtures thereof with other solvents. All of these ketones are sufficiently soluble in water to render a recovery from the solution desirable, while also from all of these ketones oxidation products having a yellow color are formed, which can be resinified with a caustic soda solution. With water all of these ketones form an azeotropic mixture boiling below 100° C. at atmospheric pressure as appears from the following table.

|  | B.P., °C. | Azeotropic mixture | |
|---|---|---|---|
|  |  | B.P., °C. | Percent $H_2O$ |
| Methyl ethyl ketone | 78 | 73.4 | 11.3 |
| Methyl isopropyl ketone | 93 |  |  |
| Methyl n-propyl ketone | 101 | 83.3 | 19.5 |
| Diethyl ketone | 102 | 82.9 | 14 |
| Methyl isobutyl ketone | 115 | 87.9 | 24.3 |
| Ethyl n-propyl ketone | 124 |  |  |
| Methyl n-butyl ketone | 127 | 90.5 | 26 |

Mixtures of these ketones with other solvents, especially with those solvents which are relatively immiscible with water, also form an azeotrope with water.

The invention will be elucidated with reference to the accompanying drawings showing an embodiment of an apparatus for carrying out the process according to the invention.

The mixture of ketone, which may contain from 0–2 parts of another solvent for each part of ketone and especially 0–1 part of solvent for each part of ketone, water and impurities obtained by condensing the vapors from the action of steam on the activated carbon is passed into a storage vessel 2, where it is vigorously stirred by an agitator 1, in order to mix the phases as homogeneously as possible. In this storage vessel the mixture is at the same time neutralized in order to remove the acids contained therein, while at the same time, if so desired, the peroxides in the mixtures may be reduced by means of any suitable reducing agent capable of reducing peroxides, for example, $NaHSO_3$, $Na_2SO_3$, hydrazine, etc.

The neutralized mixture is preheated in a heat exchanger 3 and pumped into the upper portion of the lower column 5 via a conduit 4. In said column the mixture is stripped by means of steam, which is supplied through conduit 6. It is possible to use steam, in direct contact with the liquid but a steam coil of suitable dimensions is equally suitable.

The vapor mixture formed, which contains vaporous water, ketone, resinforming constituents, and if present, vapors of the solvent, escape through an opening in the collecting tray 8 to the second column 7. The bottoms product, which consists of water and nonvolatile impurities, is passed through conduit 18 to the heat exchanger 3, where it is cooled and subsequently discharged.

In the contacting column an alkali hydroxide solution is circulated by means of pump 10 and conduit 11, which solution flows down through the column and is received in the collecting tray 8. Preferably a steam coil 9 is provided in the collecting tray 8 in order to remove the ketone and solvent dissolved in the caustic soda solution and to prevent the alkali hydroxide solution from being diluted with condensed water.

It is practical to maintain the alkali hydroxide solution at a temperature which is 5–10° C. and preferably about 7° C. higher than the boiling point of the ketone or of the mixture of the ketone and the solvent. In column 7 the vapor rising from column 5 is contacted with the alkali hydroxide solution, so that the colored oxidation product resinifies and accumulates in the caustic soda solution. The alkali hydroxide solution may have a concentration of from 2–40% by weight, but preferably about 10% by weight. When the alkali hydroxide solution has too great a content of resinified constituents it is renewed.

It is also possible to provide in the circulating conduit for the alkali hydroxide solution a device in which the formed resin settles. At the same time it is possible then to supply fresh caustic and to remove spent caustic at the point, as often as this is desirable.

The vapor escaping from column 7, which preferably consists of an azeotropic mixture of the ketone and water, may, if desired, be passed through an upper column 12 in which at the same time the droplets of caustic solution that have been entrained, are removed from the vapor. Subsequently the vapor is passed through conduit 13 to the condenser 14. The condensate is collected in the settling vessel 15. From the settling vessel the water-layer of the condensate, which still contains ketone, is recycled through conduit 17 to the storage vessel 2 and the upper layer which contains the ketone and the solvent, if present, is pumped via conduit 16 to a product storage tank.

The fractionating columns and the contacting column themselves may be of any known type and may for example comprise bubbling plated, sieve plates, Raschig rings or other filling bodies.

Although the contact time in column 7 is very short, such as 1–10 seconds, for example 3 seconds, all compounds which can be resinified are completely removed from the vapors. This is very surprising, for with known methods a much longer contact time was needed, which varied from 15 minutes to 1 hour.

The invention will be further elucidated with reference to the following examples.

*Example 1*

A batch of active carbon, which has been loaded at 70° C. with methyl ethyl ketone (MEK) by contacting the carbon with a mixed gas containing air and methyl ethyl ketone vapors is steamed by conducting steam at a pressure of 1–2 atmospheres therethrough to remove the methyl ethyl ketone from the carbon. The escaping vapor mixture is condensed and the condensate separates in a water layer and a ketone layer. Both layers are colored yellow by impurities including about 0.4% of diacetyl which have been formed by oxidation of MEK. These impurities cannot be removed by distillation.

From the storage vessel 2, which has a content of 3000 litres, 2100 kgs. per hour of this two-phase mixture, containing 600 kgs. of methyl ethyl ketone and 1500 kgs. of water and impurities, is stirred to a homogeneous mixture and pumped through the preheater 3 where it is heated from 30 to 70° C. The preheated mixture is passed into column 5, which has a diameter of 50 cms. and a height of 300 cms. The column is filled with Raschig rings. Open steam is passed into the lower portion of the column at a rate of 300 kgs. per hour. The bottoms product is discharged at a temperature of 100° C. and cooled in the heat exchanger 3 to about 60° C.

In the storage vessel 2 sufficient bisulphite was added to reduce all the peroxide present.

The vapor escaping from column 5 has a temperature of 73° C. and is passed into the lower portion of column 7. Column 7 has a height of 200 cms. and a diameter of 50 cms. and is likewise filled with Raschig rings. Pump 10 circulates 10% by weight NaOH solution having a temperature of 80° C. through the column at a rate of 300 litres per hour. The residue time of the vapor in the column is therefore less than 3 seconds. From the upper portion of column 7 an azeotropic vapor mixture containing about 12% H₂O and 88% MEK having a temperature of 75° C. escapes, which upon condensing yields a colorless layer of ketone. In order to remove entrained droplets of caustic soda solution and superfluous water vapour, if any, said vapor is passed through a short column 12 and subsequently condensed. The condensate will separate into two layers, the water layer of which is recycled through conduit 17 to the storage vessel 2. The ketone layer is pumped through conduit 16 to a storage tank. A sample of the methyl ethyl ketone thus purified was found to be entirely colorless and impurities which together with caustic soda solution will form resins, such as diacetyl, cannot be found therein.

*Example 2*

In this example a mixture of 35% toluene and 66% methyl ethyl ketone, on a weight basis was recovered. This mixture had been adsorbed on active carbon was driven off by the action of steam and had been condensed together with the steam. The condensate contained a small quantity of peroxides and about 0.2% of diacetyl.

This condensate was treated in the apparatus, described above. Per hour 2000 kgs. of the two-phase mixture were fed into the apparatus. This feed contained 1550 kgs. of water, 300 kgs. methyl ethyl ketone and 150 kgs. of toluene.

All conditions were exactly similar as in Example 1 except that in the columns 7 and 12 the temperature was about 90° C.

The recovered mixture of methyl ethyl ketone and toluene was colorless and completely free of diacetyl.

I claim:

1. Process for recovering ketone from mixture of ketone, water, volatile impurities and non-volatile impurities, said volatile impurities being capable of forming resins in alkali solution comprising:
   (1) steam-stripping said mixture at a temperature of about 100° C., whereby a vaporous admixture of ketone, water and volatile impurities is produced as distillate, and aqueous admixture of non-volatile impurities is produced as bottoms,
   (2) contacting said distillate with counter-flowing alkali solution in a vapor-liquid contact zone, whereby by said volatile impurities are resinified and accumulate in said alkali solution, and said vaporous admixture of ketone and water form a second distillate,
   (3) condensing said second distillate, whereby contiguous layers of liquid water and ketone are formed, and
   (4) recycling the water layer of step (3) to the mixture of step (1).

2. Process of claim 1 wherein said second distillate is a water-ketone azeotrope.

3. A process for recovering ketones which contain for each part of ketone not over 2 parts of a hydrocarbon solvent selected from the group consisting of benzene, toluene, hexane and petroleum fractions having a boiling point in the range between 60° C. and 140° C. and which together with said ketone and water can be volatilized from a ternary mixture of ketone, hydro-carbon solvent, water, volatile impurities and non-volatile impurities, said volatile impurities being capable of forming resins in alkali solution comprising:
   (1) steam-stripping said mixture in a distillation zone, at a temperature of about 100° C., whereby a vaporous admixture of ketone, hydrocarbon solvent, water and volatile impurities is produced as distillate, and aqueous admixture of non-volatile impurities is produced as bottoms,
   (2) contacting said distillate with counter-flowing alkali solution in a vapor-liquid contact zone, whereby said volatile impurities are resinified and accumulate in said alkali solution, and said vaporous admixture of ketone, hydrocarbon solvent and water form a second distillate, and
   (3) condensing said second distillate, whereby contiguous liquid layers are formed, consisting of (1) water and (2) ketone and hydrocarbon solvent; and
   (4) recycling the water layer of step (3) to the mixture of step (1).

References Cited by the Examiner

UNITED STATES PATENTS

| | | | |
|---|---|---|---|
| 2,018,863 | 10/1935 | Miller | 202—67 X |
| 2,040,096 | 5/1936 | Miller. | |
| 2,040,431 | 5/1936 | Dean et al. | |
| 2,081,884 | 5/1937 | Roberts | 202—40 |
| 2,146,721 | 2/1939 | Conviser | 202—154 |
| 2,342,145 | 2/1944 | Isham et al. | 202—40 |
| 2,429,484 | 10/1947 | Peters | 202—57 |
| 2,454,447 | 11/1948 | Harney et al. | |
| 2,477,087 | 7/1949 | Robertson | 202—39.5 |
| 2,575,244 | 11/1951 | Carlson et al. | 202—57 |
| 2,684,934 | 7/1954 | Weaver et al. | 202—42 |
| 2,878,169 | 3/1959 | Christmann et al. | 202—67 X |
| 2,971,894 | 2/1961 | Kendall | 202—57 |

NORMAN YUDKOFF, *Primary Examiner.*

F. E. DRUMMOND, M. H. SILVERSTEIN,
*Assistant Examiners.*